July 6, 1926.

I. S. KARRAZ

CHEESE CUTTER

Filed June 19, 1924   2 Sheets-Sheet 1

1,591,839

WITNESSES

INVENTOR
Isaac S. Karraz,
BY
ATTORNEYS

July 6, 1926.

I. S. KARRAZ

CHEESE CUTTER

Filed June 19, 1924

WITNESSES

INVENTOR
Isaac S. Karraz
BY
ATTORNEYS

Patented July 6, 1926.

1,591,839

UNITED STATES PATENT OFFICE.

ISAAC S. KARRAZ, OF BRINKLEY, ARKANSAS.

CHEESE CUTTER.

Application filed June 19, 1924. Serial No. 721,129.

This invention relates to cheese cutters, and is an improvement on U. S. Patent No. 1,366,808.

Briefly stated, an important object of this invention is to provide a cheese cutter having novel means whereby a cut of a predetermined width may be made so that the desired money return for the cheese is provided for.

A further and equally important object is to provide simple means whereby a segment of cheese may be removed upon being cut.

A further object is to provide a cheese cutter which is of highly simplified construction, sanitary and cheap to manufacture.

Other objects and advantages will be apparent during the course of the following description.

In the accompanying drawing forming part of this application, and in which like numerals are employed to designate like parts throughout the same:—

Figure 1:
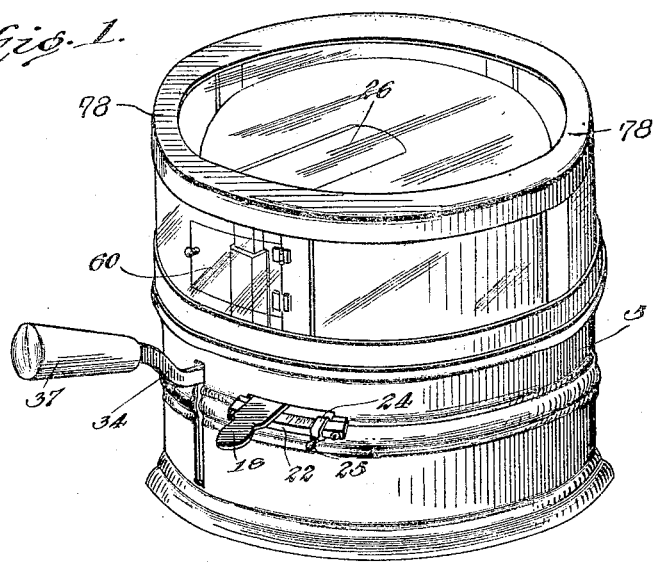
Figure 1 is a perspective of the improved cheese cutter.
Figure 2:
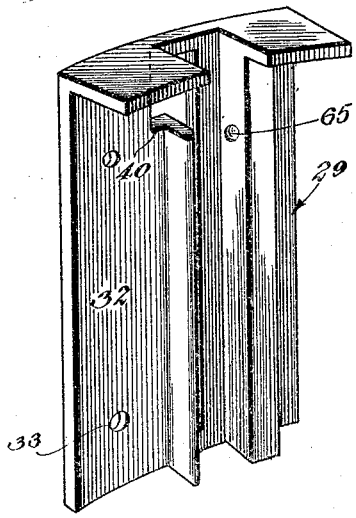
Figure 2 is a perspective of a lower guide for the shank of the cheese cutting blade.
Figure 3:
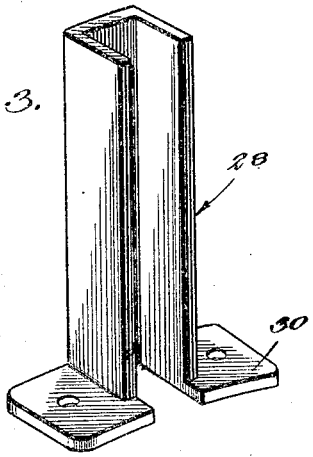
Figure 3 is a perspective of an upper guide for the shank of the cheese cutting blade.
Figure 4:
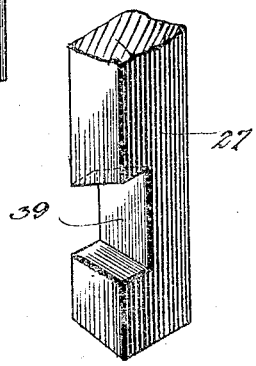
Figure 4 is a fragmentary perspective of the shank of the cheese cutting blade.
Figure 5:
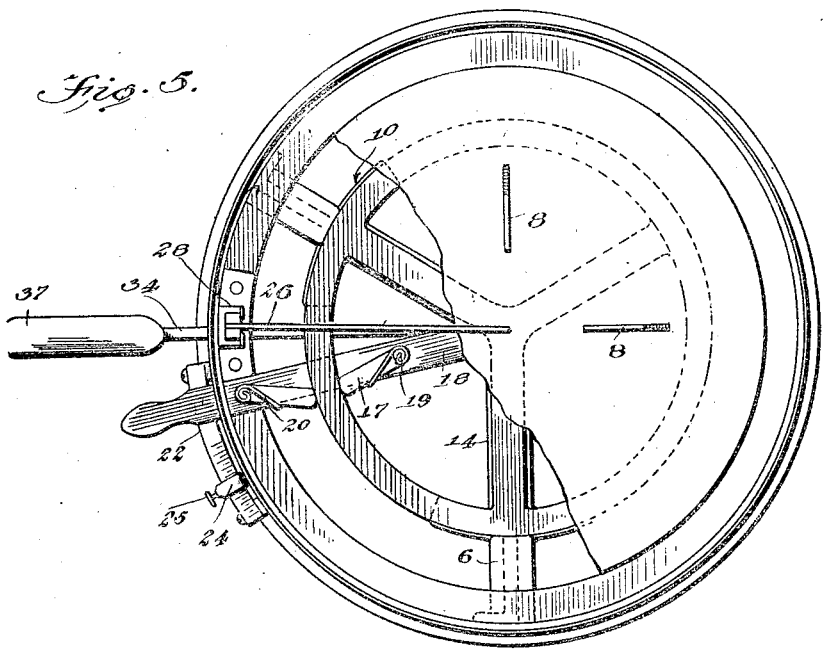
Figure 5 is a plan view of the improved cheese cutter, parts being broken away.

In the accompanying drawing, wherein for purpose of illustration is shown a preferred embodiment of the invention, the numeral 5 designates a more or less annular frame or body carrying a plurality of inwardly extending brackets 6 upon which a cheese supporting table 7 of disk shaped formation is mounted. If desired, the upper side of the table 7 may be provided with cheese anchoring devices 8 to hold the cheese firmly in position on the table.

The inner portions of the brackets 6 are provided with arcuate arms 10 upon which an annular rib 11 on the lower side of the table 7 is mounted.

Figure 6:
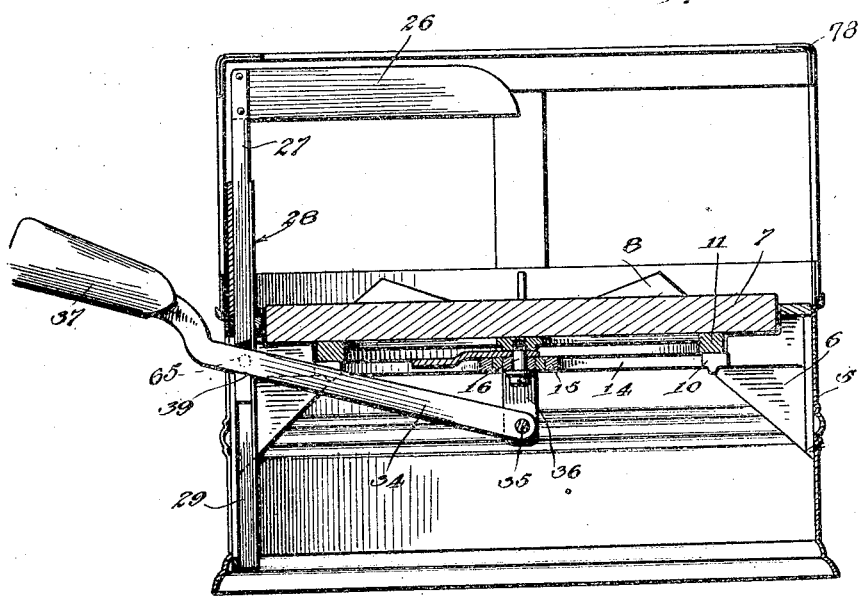
Figure 6 is a vertical sectional view through the improved cheese cutter.

The brackets 6 also have connection with a plurality of radial spoke-like members 14 having a hub 15 through which a screw bolt 16 is extended. Figure 6 plainly illustrates that the screw bolt or pivot element 16 rotatably connects the table 7 to the hub 15. Suitable anti-friction means, not shown, may be employed between the table 7 and the supporting means therefor.

The table 7 may be rotated in one direction by means of a pair of pawls 17 pivoted to a handle 18 as indicated at 19. Suitable springs 20 are connected to the pawls 17 and urge the pawls into engagement with the depending rib or annulus 11 of the table. It will be seen that the rib 11 not only forms an engaging means for the pawls 17 but also a means to prevent excessive lateral movement of the table as the rib is positioned between and is adapted to be engaged by the brackets 6.

The actuating handle 18 is rotatably connected to the pivot bolt 16 and when it is moved in a counter clockwise direction, the pawls 17 being in engagement with the depending annulus 11 will turn the table. On the return movement of the handle 18 the pawls 17 will merely ride along the perfectly plain edges of the annulus and the table will remain in its previously set position.

The outer portion of the handle 18 plays over a scale 22 having a plurality of calibrations indicating the extent to which the handle is moved. A suitable stop element 24 is adjustably secured on the scale 22 by means of a set screw 25 or the like so that the movement of the handle to its advanced position may be regulated.

The knife to cut the cheese into a number of segments is designated by the numeral 26 and is connected with a vertically arranged shank 27. The shank 27 is movable through upper and lower guide members 28 and 29 respectively, the guide members being located in superposed relation with the grooves thereof in alinement with each other so as to slidably receive the shank of the blade.

The lower end of the upper guide member 28 is provided with laterally projecting attaching feet 30 having openings for the reception of fastening devices of any suitable type. The lower guide member is provided with laterally projecting attaching flanges 32 having openings 33 for the reception of fastening means whereby the lower guide member 29 may be secured to the side of the container or support for the cheese.

Figure 6 clearly illustrates that a main blade operating lever 34 is pivoted as indicated at 35 to a supporting member 36 and has its rear end arranged exteriorly of the cheese container and provided with a handle 37. One side of the shank 27 has a notch 39 which receives the handle 34 so that a combined sliding and driving connection is provided between the lever and the shank 27.

However, when it is desired to place a piece of cheese on the table 7, the knife 26 is moved upwardly to the limit of its upward movement and the lever 34 is then moved laterally into a transverse branch 40 in the guide 29 so that the shank 27 may be entirely disconnected from the lever 34. That is to say, the lever 34 may be moved laterally out of engagement with the shank 27 so that the blade 26 may be entirely disconnected from the cutter and this permits a piece of cheese to be mounted on the table. Of course prior to disconnecting the blade from the cutter the top or cover 78 is removed.

In use the blade 26 is first disconnected from the cutter and a piece of cheese is mounted on the table 7. The blade is now again connected to the cutter and when it is desired to cut a segment of cheese the handle 37 is moved downwardly by the operator so that the blade is drawn through the cheese. The handle 18 is now moved in a counter-clockwise direction until it engages the stop element 24. This presents a new cutting surface to the blade and the handle 37 is again moved downwardly so as to cut a segmental piece of cheese from the main body of cheese.

One of the principal advantages resulting from the means to limit the size of a cut is the fact that the cylindrical bodies of cheese vary in weight, some weighing 19 while others run as high as twenty-three pounds. If the piece of cheese has a sale value of $8.40 and weighs 21 pounds the limit of each cut is so adjusted that when the main body of cheese is completely cut into segments for retail purposes a return of $8.40 will be provided for. In other words, all the segments of cheese will be of the same weight and price.

A further improved feature of the invention resides in the fact that after each cut is made a door 60 in the cover 78 may be swung open to permit of the convenient removal of the segment of cheese. A suitable means, not shown, may be employed to keep the door normally closed.

In carrying out the invention a spring actuated ball 65 may be carried by the lower guide so as to hold the shank 27 in an elevated position so that it may be conveniently moved downwardly through the cheese. Of course the shank 27 is moved upwardly by the lever 34, and the spring actuated ball 65 is engaged in a suitable notch in the shank 27 whereby the blade is held in an elevated position.

I claim:—

1. A cheese cutter comprising a support having a plurality of brackets provided with laterally projecting arms of arcuate formation, a table having its underside provided with an annular rib mounted on said arcuate arms and confined between said brackets, radially arranged members having connection with said brackets and having a hub, means extending through said hub to rotatably connect the table to the hub, a pivoted handle extending beneath said table, a pair of spring-actuated pawls carried by said handle and respectively adapted to frictionally engage the inner and outer faces of said rib, a scale over which said handle operates, said scale being calibrated, a stop adjustably secured on said scale to limit the movement of said handle, and a vertically movable blade arranged over said table.

2. In a cheese cutter, a vertically arranged guideway having a lateral branch, a cheese cutting knife having a vertically arranged shank received in said guideway and having a notch, and a lever detachably received in said notch and adapted to move said shank vertically, said branch being adapted to receive said lever whereby the lever may be disconnected from the shank to permit of the removal of the shank.

3. In a cheese cutter, a vertically arranged guideway, a cheese cutting knife having a vertically arranged shank received in said guideway and having a notch, and a lever detachably received in said notch and adapted to move said shank vertically, said guideway being provided with means whereby to support the lever in an inoperative position and to permit the lever to be removed from said notch.

ISAAC S. KARRAZ.